(12) United States Patent
Sano et al.

(10) Patent No.: US 9,108,169 B2
(45) Date of Patent: Aug. 18, 2015

(54) DESALINATION TREATMENT MEMBRANE

(71) Applicant: Kabushiki Kaisha Toshiba, Minato-ku (JP)

(72) Inventors: Kenji Sano, Tokyo (JP); Hideyuki Tsuji, Yokohama (JP); Arisa Yamada, Kawasaki (JP); Akihiro Matsui, Shanghai Road (JP); Yasunari Maekawa, Maebashi (JP); Shin Hasegawa, Takasaki (JP); Shinichi Sawada, Takasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/027,392

(22) Filed: Sep. 16, 2013

(65) Prior Publication Data

US 2014/0083930 A1    Mar. 27, 2014

(30) Foreign Application Priority Data

Sep. 27, 2012 (JP) ................................. 2012-214301

(51) Int. Cl.
| | |
|---|---|
| *B01D 39/00* | (2006.01) |
| *B01D 39/14* | (2006.01) |
| *B01D 71/26* | (2006.01) |
| *B01D 29/46* | (2006.01) |
| *B01D 71/10* | (2006.01) |
| *B01D 71/78* | (2006.01) |
| *B01D 61/00* | (2006.01) |
| *B01D 61/02* | (2006.01) |

(Continued)

(52) U.S. Cl.
CPC .............. *B01D 71/78* (2013.01); *B01D 61/002* (2013.01); *B01D 61/025* (2013.01); *B01D 65/10* (2013.01); *C02F 1/445* (2013.01); *B01D 71/10* (2013.01); *B01D 2323/38* (2013.01); *C02F 2103/08* (2013.01)

(58) Field of Classification Search
CPC .. B01D 61/002; B01D 69/10; B01D 2323/30; C02F 1/44; C02F 103/08
USPC ............ 210/638, 642, 644, 490, 663, 500.35, 210/500.29
See application file for complete search history.

(56) References Cited

U.S. PATENT DOCUMENTS

| | | | |
|---|---|---|---|
| 4,340,057 A * | 7/1982 | Bloch et al. .................... | 604/358 |
| 6,358,557 B1 | 3/2002 | Wang et al. | |

(Continued)

FOREIGN PATENT DOCUMENTS

| | | |
|---|---|---|
| CA | 2 771 902 | 3/2011 |
| JP | 1-242106 | 9/1989 |
| JP | 2003-510378 | 3/2003 |

OTHER PUBLICATIONS

E. Bittencourt et al. "Novel Ion-Containing Reverse Osmosis Membranes. II. Reverse Osmosis Properties", Journal of Applied Polymer Science, vol. 26. 1981, 10 pages.

(Continued)

*Primary Examiner* — Ana Fortuna
(74) *Attorney, Agent, or Firm* — Oblon, McClelland, Maier & Neustadt, L.L.P.

(57) ABSTRACT

According to one embodiment, a desalination treatment membrane includes a desalting membrane and a base material which is disposed in close contact with the desalting membrane, wherein a solid salt is fixed to the base material by a graft-polymerization.

17 Claims, 4 Drawing Sheets

(51) Int. Cl.
*B01D 65/10* (2006.01)
*C02F 1/44* (2006.01)
*C02F 103/08* (2006.01)

(56) References Cited

U.S. PATENT DOCUMENTS

| | | | |
|---|---|---|---|
| 7,677,398 B2* | 3/2010 | Belfer et al. | 210/500.38 |
| 8,181,794 B2* | 5/2012 | McGinnis et al. | 210/500.38 |
| 8,263,287 B2* | 9/2012 | Takahashi et al. | 429/493 |
| 8,329,034 B2* | 12/2012 | Waller et al. | 210/338 |
| 2008/0269417 A1 | 10/2008 | Belfer et al. | |
| 2012/0205309 A1* | 8/2012 | Sano et al. | 210/638 |
| 2012/0234758 A1* | 9/2012 | McGinnis et al. | 210/652 |
| 2014/0042089 A1* | 2/2014 | Matsui et al. | 210/638 |
| 2014/0083930 A1* | 3/2014 | Sano et al. | 210/500.29 |

OTHER PUBLICATIONS

El-Sayed A. Hegazy et al. "Ion-Containing Reverse Osmosis Membranes Obtained by Radiation Grafting Method", Radiat. Phys. Chem. vol. 33. No. 1, 1989 pp. 13-18.

Chinese Office Action issued Mar. 3, 2015, in Chinese Patent Application No. 201310409260.X (with English-language Translation).

* cited by examiner

DESALINATION TREATMENT MEMBRANE

CROSS-REFERENCE TO RELATED APPLICATIONS

This application is based upon and claims the benefit of priority from Japanese Patent Application No. 2012-214301, filed Sep. 27, 2012, the entire contents of which are incorporated herein by reference.

FIELD

Embodiments described herein relate generally to a desalination treatment membrane for desalination of salt water such as seawater.

BACKGROUND

Reverse osmosis membrane (RO membrane) methods have hitherto been widely used in a desalination method of seawater. A reverse osmosis desalination method (RO method) is a method in which a pressure of about 55 atmospheres is applied to an osmosis membrane in a direction opposite to the osmotic pressure, thereby taking out fresh water from about 3.5% by weight seawater.

It is known that when a polymer electrolyte membrane obtained by a direct graft-polymerization of an electrolyte monomer to a hydrophobic polymer membrane is utilized in the RO method, a transmembrane flow rate is increased.

On the other hand, a forward osmosis membrane seawater desalination method (FO method) is known as the desalination method. According to this method, an osmosis membrane, which is the same as that used in the RO method, is used, and an aqueous ammonium carbonate having a higher concentration than that of seawater is disposed at a support membrane side, whereby fresh water is drawn into the aqueous ammonium carbonate side due to an osmotic pressure caused by ammonium carbonate, without applying a pressure. After that, the temperature of the ammonium carbonate solution is elevated to about 60° C. by heating it to decompose it into carbonic acid and ammonia, from which water is removed, thus resulting in acquisition of fresh water.

Further, there is also a composite semipermeable membrane having an ionic group or non-ionic group.

DETAILED DESCRIPTION

Figure 1:
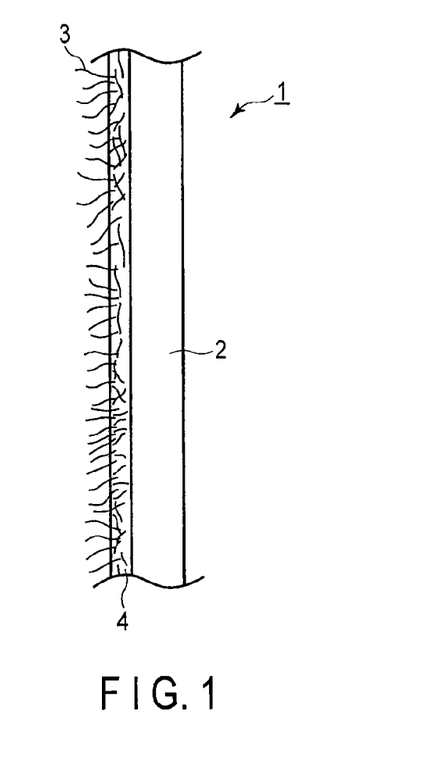
FIG. 1 is a view showing one example of a desalination treatment membrane of embodiment.

In general, according to one embodiment, a desalination treatment membrane comprises a desalting membrane, and a base material which is disposed in close contact with the desalting membrane, wherein a solid salt is fixed to the base material by a graft-polymerization. Specifically, as shown in FIG. 1, a desalination treatment membrane 1 comprises a desalting membrane 2, and a base material 4 which is disposed in close contact with the desalting membrane 2 and to which a solid salt 3 is fixed by a graft-polymerization.

According to a desalination treatment method in which water (fresh water) is taken out from salt water using such a desalination treatment membrane, the desalting membrane of the desalination treatment membrane is disposed on the salt water side, and the base material is disposed on the fresh water side.

According to a general forward osmotic pressure seawater desalination method, basically, fresh water is absorbed from seawater and recovered. For that reason, a solution having a higher salt concentration than that of seawater is located at a side opposite to seawater through an osmosis membrane, thereby inducing an osmotic pressure necessary for permeation of water in the seawater through the osmosis membrane to force the water into the solution having a higher salt concentration. Ammonium carbonate has hitherto been used as the salt.

Ammonium carbonate has a high solubility in water, and is decomposed into ammonia and carbonic acid at 60° C., which are released as gases. The remaining water, accordingly, is fresh water.

According to the embodiment, instead of the solution having a higher salt concentration described above, the base material to which the solid salt is fixed by the graft-polymerization is disposed in close contact with the desalting membrane. In a method of performing desalination treatment using the desalination treatment membrane in which the base material is disposed in close contact with the desalting membrane, therefore, the desalting membrane is disposed on the seawater side, and the base material is disposed on the fresh water side. At this time, the solid salt, which is fixed to the base material by the graft-polymerization, has a function of inducing an osmotic pressure necessary for permeation of water in seawater through the desalting membrane. In addition, the solid salt swells with water which has permeated the desalting membrane, but is not dissolved in the water within a given temperature range. Furthermore, because the solid salt is graft-polymerized to the base material, it is not separated from the base material, and remains stably on the base material surface. As a result, the water, which has permeated the desalting membrane, moves stably to the fresh water side through the base material, and is recovered. According to the conventional method using the ammonium carbonate solution having a high salt concentration, operations are required in which water in the seawater is forced to permeate the osmosis membrane and to move into an ammonium carbonate solution, and then the solution is heated to 60° C. or higher to release ammonia and carbonic acid as gases. According to the embodiment, however, the heating treatment is not required. In addition, when the same pressure as that used in the RO method, which has been conventionally performed, is applied, fresh water is generated from salt water at a higher flow rate compared to the conventional RO method. Furthermore, even if a lower pressure is applied, fresh water is generated from salt water. It is possible, therefore, to perform the desalination of salt water at a lower energy than that expended in the conventional method.

As the desalting membrane, a membrane which is utilized as an osmosis membrane, such as a cellulose acetate membrane or a polyamide membrane, may be used. The desalting membrane has preferably a thickness of 45 μm to 250 μm.

Examples of the base material include a paper, cotton, a cellulose membrane such as cupra, rayon or copper ammonium rayon, a fabric, or a resin membrane. Of these, a soft paper such as a filter paper and a non-woven fabric, which are capable of preventing damage to the desalting membrane under pressure, are preferable. The base material has preferably a thickness of 1 μm to 100 μm. Resin beads may also be used as the base material. In this case, the resin used may be resins capable of the graft-polymerization, such as polystyrene, polyethylene, cellulose, or processed cellulose. The base material to which the solid salt is graft-polymerized is referred to as the "grafted base material".

The polymer to be graft-polymerized to the base material may be a polymer capable of converting to a solid salt in a later step and insoluble in fresh water. The polymer polymerized may be in the state of a salt, and it may be understood that the polymer polymerized in the state of a salt is the solid salt. The solid salt may be, for example, organic salts. The organic salt may include, for example, acrylic acid salts such as sodium acrylate and potassium acrylate; methacrylic acid salts such as sodium methacrylate and potassium methacrylate; sulfonic acid salts, quarternary ammonium salts, and the like. When the base material is for example a non-woven fabric, the state of the graft-polymerization is that the fiber is graft-polymerized.

The graft rate of the solid salt to the base material may be, for example, from 2% to 50%. The graft rate varies depending on the base material. For example, in a case of the non-woven fabric, the graft rate is preferably from 2% to 5%.

Here, the term "graft rate" refers to a weight ratio of the base materials before and after the graft-polymerization, and expresses an increased weight after the graft-polymerization relative to the base material.

It is preferable that the graft rate of the solid salt to the base material is made sufficiently high, for exceeding a salt concentration of seawater. When the graft rate is too high, however, clogging may occur. The graft rate has a trade-off relationship with an amount of water permeating the base material.

The grafted base material may be closely brought into contact with the desalting membrane so that the passage of liquid is not inhibited through holes in both of the grafted base material and the desalting membrane. For example, even if they are only bonded or pasted to each other at the peripheral part with an adhesive, they are immobilized with a support such as a frame, or they are secured with a net or only an arrangement, they are closely brought into contact with each other under a high pressure.

When the grafted base material is closely brought into contact with the desalting membrane, it is preferable that the grafted base material is disposed on an active layer side of the desalting membrane, if the membrane has no problem.

In the embodiment, the salt water is, for example, seawater. The salt concentration of the salt water to be treated may be from 0.5% to 5%.

In the embodiment, it is preferable that the base material side is previously brought into contact with fresh water. When the base material side is brought into contact with fresh water, the solid salt, which is graft-polymerized to the base material, previously swells with fresh water, and thus the permeation of water in salt water through the desalting membrane is promoted, and it is possible to reduce the desalination treatment time.

In the embodiment, a pressure may be applied to the desalination treatment membrane from the salt water side, if necessary.

When the embodiment is used for desalination treatment, it may be used in the state in which the seawater and fresh water are brought into contact with both sides of the desalination treatment membrane in a sealing treatment vessel. The shape of the sealing treatment vessel may be various shapes such as rectangular, cylindrical, conical, rectangular column, and pyramid shapes, which are hollow.

Example 1

(1) Graft-Polymerization of Solid Salt to Base Material

As the base material, filter paper (No. 5B for Kiriyama-rohto, 40 φ mm) was used. Acrylic acid was graft-polymerized to the filter paper, which was subjected to an alkali treatment, whereby a solid salt is formed as an acrylic acid salt. Specifically, the following was done.

The filter paper (No. 5B for Kiriyama-rohto, 40 φ mm) was put in a glass tube, and substitution by argon gas was performed after degassing. Gamma-rays from cobalt 60 were applied to polystyrene beads at an absorbed dose of 15 kGy at room temperature while this state was kept. An aqueous acrylic acid solution (50% by weight), which had been degassed by bubbling with argon gas, was added to the glass tube. Next, the glass tube was sealed, which was maintained at 30° C. for 5 hours. The obtained graft-polymerized filter paper was washed with purified water. After it was vacuum dried at 40° C., a graft rate of 3.6% was calculated from a weight of the graft-polymerized filter paper. The processed filter paper was immersed with 1 N NaOH, and then it was washed for more than 2 hours while pure water was poured, thereby obtaining a base material to which the solid salt was grafted. The obtained one was used in the subsequent tests.

(2) High Pressure Test with Fresh Water

A high pressure test was performed using the base material to which the solid salt was grafted which was produced (1) above.

Figure 2:
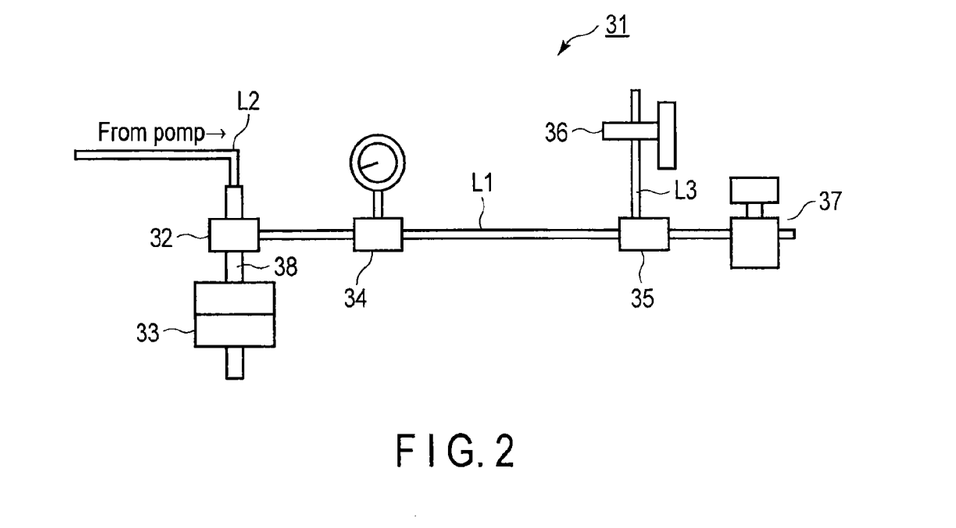
FIG. 2 is a view showing a test apparatus.

The high pressure test was performed as shown in FIG. 2. A test apparatus 31 includes a main first pipe L1. A first connector 32 is attached to a left end of the first pipe L1. A cell 33 is connected to the first connector 32 through an introduction pipe 38. A second pipe L2, to which a pump (not shown) is attached at one end, is connected to the introduction pipe 38. A second connector 35 is attached to a vicinity of a right end of the first pipe L1. A pressure gauge 34 is attached to the first pipe L1 between the first and second connectors 32 and 35. A third pipe L3 is connected to the second connector 35, and a first pressure-releasing valve 36 is attached to the third pipe L3. A second pressure-releasing valve 37 is attached to the first pipe L1 on the right end from the second connector 35.

Figure 3:
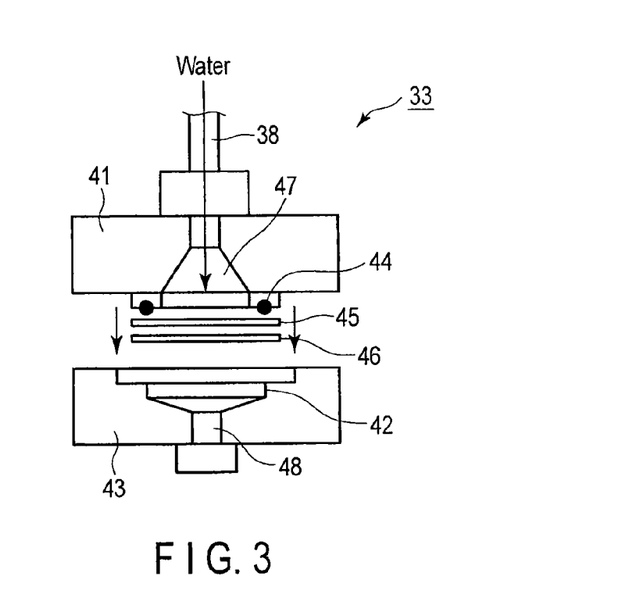
FIG. 3 is a view showing a structure of a cell.

The structure of the cell 33 is shown in FIG. 3. The cell 33 includes a first support member 41, and a second support member 43, which is arranged below facing the first support member 41. The first support member 41 is formed so that a flow channel 47, into which the introduction pipe 38 in FIG. 2 is communicated, penetrates it up and down. An O-ring 44, which plays a role as a gasket, is attached to an undersurface of the first support member 41 so as to surround an opening of the flow channel 47. The second support member 43 is formed so that a perforated plate 42 and a flow channel 48 penetrate it up and down from the upper side. A desalting membrane 45 and a filter paper 46 are arranged on the perforated plate 42 of the second support member 43 in this order. The desalting membrane 45 and the filter paper 46 are arranged between the flow channel 47 in the first support member 41 and the flow channel 48 in the second support member 43 by abutting an undersurface of the first support member 41 against an upper surface of the second support member 43 in this state and fixing them. Water, flowing in the flow channel 48 of the first support member 41, passes through the desalting membrane 45 and the filter paper 46, and flows in the perforated plate 42, and then is discharged from an outlet, which opens from a bottom of the flow channel 48 toward the outside of the second support member 43, thereby measuring a quantity of flow. In a blank test, the filter paper was not arranged in the cell.

As shown in FIGS. 2 and 3, in the test, pure water was poured into the cell 33 of the test apparatus 31 from the pump, and the pump and the first pressure-releasing valve and the second pressure-releasing valve were controlled so that the osmotic pressure is 1 MPa. As the osmosis membrane, ES 20, which is an RO membrane manufactured by Nitto Denko Corporation, was used.

The results are shown in Table 1. After water passage for 30 minutes, a quantity of flow of water which flowed for 5 minutes was measured 5 times, and an average value thereof was obtained. The quantity of flow was obtained by measuring an amount of water which flowed out to the outside of the second support member 43 through the perforated plate 42.

TABLE 1

| Fresh water | 1 MPa 2 ml/min | |
|---|---|---|
| No | Filter paper alone quantity of flow for 5 minutes (g) | Graft rate 2.4% quantity of flow for 5 minutes (g) |
| 1 | 1.65 | — |
| 2 | 1.64 | 1.81 |
| 3 | 1.65 | 1.75 |
| 4 | 1.66 | 1.78 |
| 5 | 1.67 | 1.79 |
| Average | 1.65 | 1.79 |

A base material to which the solid salt was grafted having a different graft rate was produced in the same manner as in (1) above. Using this base material, the test was performed in the same manner described in (2) above. The results are shown in Table 2. The graft rates of the used base material to which the solid salt was grafted were 2.4%, 3.2%, and 3.7%.

TABLE 2

| Graft rate and ratio of increase in amount of water | |
|---|---|
| Graft rate | Increase in amount |
| 2.4% | 11% |
| 3.2% | 8% |
| 3.7% | −2% |

As shown in Table 2, a quantity of flow for 5 minutes according to the difference in the graft rate was shown as an increase of amount based on a quantity of flow obtained for 5 minutes in a blank with no filter paper. When the graft rate was 2.4%, the largest amount of the quantity of flow was obtained. This is about 10% increase of the amount compared to the quantity of flow without the filter paper. As a p value, according to a dispersion analysis, was 0.05% or less, when the grafted base materials were used, the quantities of flow were statistically significantly increased in any case compared to the blank. When the graft rate was 3.7%, the increase of amount showed a value of "−," but this was considered because a pressure drop became larger due to clogging.

Example 2

Results of Filter Paper Syringe Test

Figure 4:
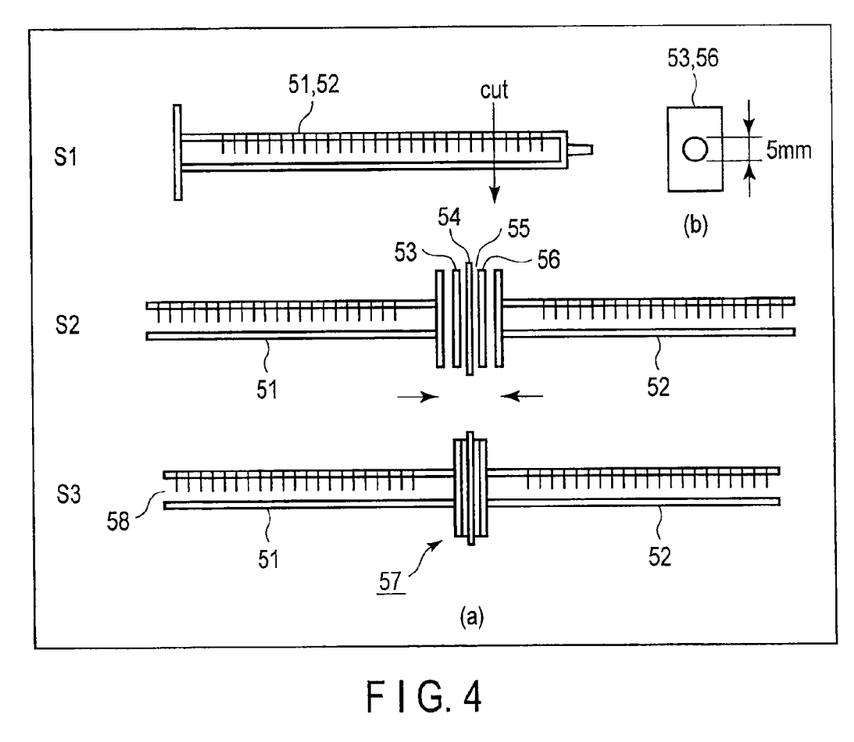
FIG. 4 is a view showing a syringe test apparatus.

Referring to FIG. 4(a), manufacturing of a syringe test apparatus is explained. First, two 1 ml-disposable resin syringes 51 and 52 were prepared. A tip of each resin syringe 51 and 52 was cut off (step S1). Grip sites of the obtained two syringes 51 and 52 cut were faced to each other, and two rubber sheets and one desalting membrane were put between them. The first syringe 51, the first rubber sheet 53, the grafted base material 54, the desalting membrane 55, the second rubber sheet 56, and the second syringe 52 were put in this order, and they were fixed with a clip (not shown) (step S2), whereby a syringe test apparatus 57 was obtained (step S3).

As the desalting membrane 55, ES 20, which is an RO membrane manufactured by Nitto Denko Corporation, was used. A filter paper was used as the grafted base material 54 to which polyacrylic acid was introduced by graft-polymerization and which was treated with NaOH. Plate-like rubber sheets were used as the first and the second rubber sheets 53 and 56, and the rubber sheets had circular hoes with a diameter of 5 mm, as shown in FIG. 4(b).

Next, pure water was injected to an opening 58 of the first syringe 51 in this syringe test apparatus 57. The pure water was injected until it was brought into contact with the desalting membrane 55. The move of the water from the first syringe 51 to the second syringe 52 was observed up to 6 hours after it was allowed to stand.

Figure 5:
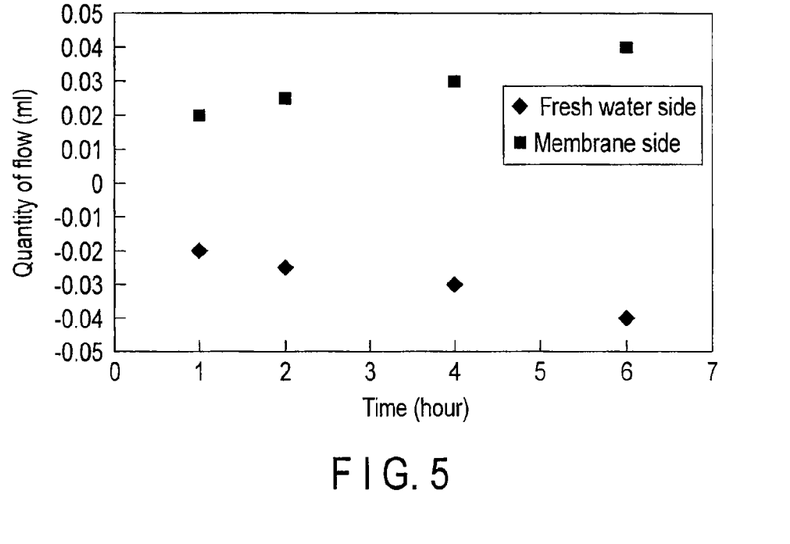
FIG. 5 is a view showing results of a syringe test.

The results are shown in FIG. 5. As understood from FIG. 5, the pure water injected to the first syringe 51 was sucked by the grafted base material 54, and was gradually moved to the inside of the second syringe 52. At this time, it was confirmed that the pure water added to the first syringe 51 and the water moved to the inside of the second both were neutral in pH. From this, it became apparent that the move of liquid from the inside of the first syringe 51 to the inside of the second syringe 52 was not caused by contamination of impurity ions.

On the other hand, even if the same syringe test apparatus was used, in the case of the syringe test apparatus in which the grafted base material 54 was arranged so as not to be brought into contact with the desalting membrane 55, the move of liquid from the first syringe 51 to the second syringe 52 was not observed.

From these results, it was apparent that in this syringe test apparatus 57, the grafted base material 54 had a function of sucking water. When such a grafted base material 54 is made to face salt water such as seawater through the desalting membrane, which is brought into close contact therewith, it is possible to suck water on the grafted base material side.

Example 3

Figure 6:
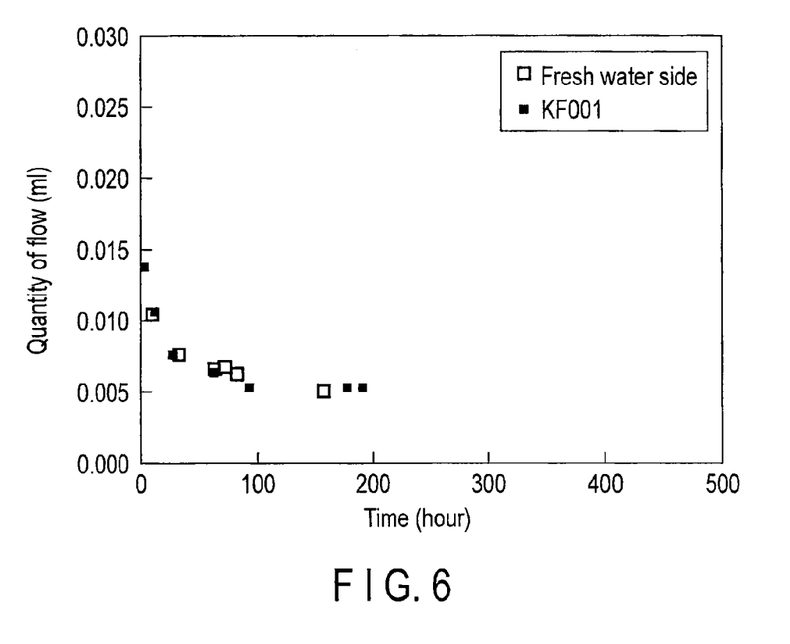
FIG. 6 is a view showing results of a high pressure test.

A high pressure test was performed in the method described in (2) of Example 1, except that a grafted base material, which was produced in the same manner as in (1) of Example 1, was used, and 1% by weight salt water was used instead of fresh water. As the desalting membrane, ES 20, which is an RO membrane manufactured by Nitto Denko Corporation, was used. The results are shown in FIG. 6. As shown in FIG. 6, it was confirmed that the observation at about 200 minutes at which the quantity of flow of the liquid flowed from the second support member 43 was stabilized showed 4% increase in the quantity of flow, compared to the blank.

Figure 7:
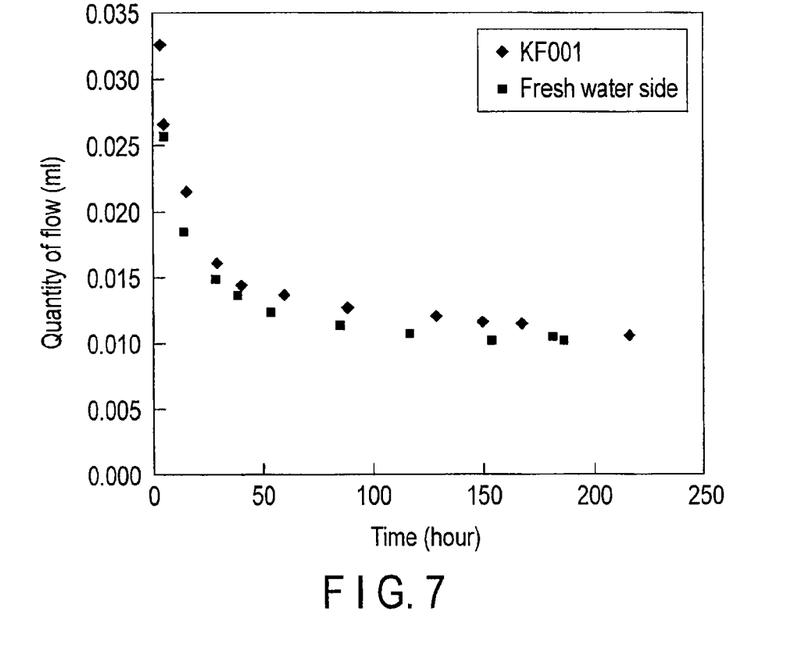
FIG. 7 is a view showing results of a high pressure test.

Similarly, a high pressure test was performed injecting 0.5% by weight salt water to the flow channel 47 of the first support member 41. As the desalting membrane, ES 20, which is an RO membrane manufactured by Nitto Denko Corporation, was used. The results are shown in FIG. 7. As shown in FIG. 7, it was confirmed that the observation at about 150 minutes at which the quantity of flow of the liquid flowed from the second support member 43 was stabilized showed 18% increase in the quantity of flow, compared to the blank.

Example 4

Grafted Base Material Using Fabric

As the base material, a nylon fabric (rectangle 5×3 cm) was used. This base material was put in a glass tube, and substitution by argon gas was performed after degassing. Gamma-rays from cobalt 60 were applied to the nylon fabric at an absorbed dose of 15 kGy at room temperature while this state was kept. An aqueous acrylic acid solution (50% by volume), which had been degassed by bubbling with argon gas, and 0.1 g of Mohr's salt were added to the glass tube. Next, the glass tube was sealed, which was maintained at 30° C. for 33 hours. The obtained graft-polymerized nylon fabric was washed with purified water. After it was vacuum dried at 40° C., a graft rate of 36% was calculated from a weight of the graft-polymerized nylon fabric. The nylon fabric was used as the grafted base material.

Using this grafted base material, a test was performed in the same method as the high pressure test method described in (2) of Example 1 described above using fresh water. As a result, it was confirmed that the amount of liquid recovered was increased compared to that in the blank. However, because grains of the surface of the nylon fabric included in the grafted base material remained were observed on the surface of the desalting membrane, which was used at the same time, the results were not adopted because of concern in which the desalting membrane might be damaged.

Example 5

Grafted Base Material Using Non-Woven Fabric

As the base material, a resin membrane (a non-woven fabric) was used. A PP (polypropylene) core-sheath PE (polyethylene) non-woven fabric (EX02 manufactured by Kurashiki Textile Manufacturing Co., Ltd., 5×3 cm rectangle) was put in a glass tube, and substitution by argon gas was performed after degassing. Gamma-rays from cobalt 60 were applied to the non-woven fabric at an absorbed dose of 15 kGy at room temperature while this state was kept. An aqueous acrylic acid solution (50% by volume), which had been degassed by bubbling with argon gas, and 0.1 g of Mohr's salt were added to the glass tube. Next, the glass tube was sealed, which was maintained at 30° C. for 4 hours. The obtained graft-polymerized non-woven fabric was washed with purified water. After it was vacuum dried at 40° C., a graft rate of 37.5% was calculated from a weight of the graft-polymerized non-woven fabric. The non-woven fabric was used as the grafted base material.

Using this grafted base material, a test was performed in the same method as the high pressure test method described in (2) of Example 1 using fresh water. As a result, 7 to 8% increase in the amount of liquid recovered was observed compared to that in the blank. The syringe test described in Example 2 was also performed. As a result, 5.5% to 11% increase was confirmed compared to the non-treated non-woven fabric.

Example 6

Base Material Using Beads

To a glass tube were added 30 g of polystyrene beads with a diameter of 1 mm, and substitution by argon gas was performed after degassing. Gamma-rays from cobalt 60 were applied to the polystyrene beads at an absorbed dose of 15 kGy at room temperature while this state was kept. An aqueous acrylic acid solution (50% by volume), which had been degassed by bubbling with argon gas was added to the glass tube. Next, the glass tube was sealed and maintaining at 30° C. for 33 hours. The obtained graft-polymerized beads were washed by decantation in which the beads were immersed in methanol for 24 hours. After they were vacuum dried at 40° C., a graft rate was calculated from a weight of the beads. The graft rate (G % by weight) is expressed by the following formula:

$$\text{Graft Rate (Grafting)} = 100 \times (W_g - W_0)/W_0$$

Where, $W_0$ is weight in dry state before graft (g) and $W_g$ is weight in dry state after graft (g)

As described above, the grafted base material, which had a graft rate of 3.5% or 1.4% and used the polystyrene beads as the base material, was produced.

The graft-polymerization was performed by applying gamma rays to the polystyrene beads with a diameter of 1 mm, and then graft-polymerizing them with acrylic acid.

Example 7

The suction property of the grafted base materials and the directivity of the desalting membrane were tested. First, a syringe test apparatus was produced in the same manner as in Example 2 described above. The syringe test using the syringe test apparatus were performed at room temperature. In general, the syringe test is a test in which water is filled at both side of an osmosis membrane put between rubber plates with circle hole with a diameter of 5 mm, and an amount of water passing through the membrane due to an osmotic pressure is obtained by reading a scale of the syringe.

Figure 8:
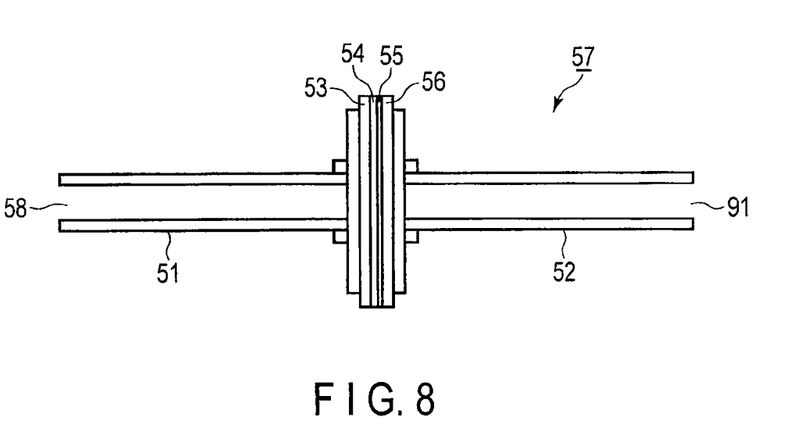
FIG. 8 is a view showing a syringe test apparatus.

In a syringe test apparatus 57 shown in FIG. 8, a desalting membrane 55 was arranged between a first syringe 51 and a second syringe 52. When a grafted base material 54 was used, a base material using the beads produced in Example 6 was used as the grafted base material 54, which was arranged in the first syringe 51. Table 3 summarizes a structure of the desalting membrane 55, liquid in the first and second syringes, the presence or absence of the grafted base material 54 and a graft rate if it is present, and a move speed and a move direction of liquid in the first and second syringes (i.e., increase or decrease of the content).

TABLE 3

| Test No. | Membrane structure (S: Support layer A: Active layer) | First syringe Component | First syringe Move speed | Second syringe Component | Second syringe Move speed |
|---|---|---|---|---|---|
| 1 | ES20, A/S | 3.5% salt water | 0.08 ml/hour increase | Fresh water | 0.15 ml/hour decrease |
| 2 | 70SWC | Fresh water | 0.07 ml/hour decrease | 3.5% salt water | 0.05 ml/hour increase |
| 3 | ES20, A/S | 3.5% salt water | 0.014 ml/24 hours increase | Fresh water | 0.028 ml/24 hours decrease |
| 4 | ES20, A/S | 1% salt water | 0.08 ml/hour increase | Fresh water | 0.08 ml/hour decrease |
| 5 | ES20, A/S | Fresh water | 0.04 ml/hour decrease | 1% salt water | 0.001 ml/24 hours increase |
| 6 | ES20, A/S | Fresh water + beads (3.5%) | 0.072 ml/24 hours increase | Fresh water | 0.11 ml/24 hours decrease |
| 7 | ES20, A/S | Fresh water | 0.073 ml/24 hours decrease | Fresh water + beads (3.5%) | 0.042 ml/24 hours increase |
| 8 | ES20, A/S | Fresh water + beads (1.4%) | 0.053 ml/24 hours increase | Fresh water | 0.11 ml/24 hours decrease |
| 9 | ES20, A/S | Fresh water | 0.003 ml/24 hours decrease | Fresh water + beads (1.4%) | 0.02 ml/24 hours decrease |

In Table 3, the structure of the desalting membrane used is described as "membrane structure." In Table 3, "S: support layer" and "A: active layer" refer to the desalting membrane used, for example, two membranes forming the RO membrane, i.e., refer to a support membrane and an active membrane, respectively. The description "A/S" refers to a direction of the desalting membrane, and the description "A/S" means that the active layer and the support layer are arranged so that they face the first syringe side and the second syringe side respectively.

In Test Nos. 1, 3, and 4 to 9, as the desalting membrane, ES 20, which is an RO membrane manufactured by Nitto Denko Corporation, was used. In Test No. 2, as the desalting membrane, 70SWC which is an RO membrane manufactured by Nitto Denko Corporation, was used.

In test Nos. 1, 2, 3, 4, and 5, saline was included in either syringe.

In Test Nos. 6 to 9, polystyrene beads obtained by subjecting polystyrene beads, which were produced in the method described in Example 6, to a graft-polymerization, were used by dispersing in liquid as the grafted base material. The graft-polymerized beads were treated with 0.1 N aqueous NaOH solution for 5 minutes, washed with water, filtered, and were put in the syringe test machine as they were wet. Under conditions shown in Table 3, the change of liquid in the first syringe and the change of liquid in the second syringe were observed.

In Test No. 1, 3.5% salt water was injected to the first syringe, and fresh water was injected to the second syringe. As a result, the amount of the liquid in the first syringe was increased, and the liquid surface was moved at a speed of 0.08 ml/hour in a direction to the opening 58 of the first syringe. On the other hand, the amount of the liquid in the second syringe was decreased, and liquid surface was moved at a speed of 0.15 ml/hour in a direction to the desalting membrane, i.e., the direction to the first syringe.

In Test No. 2, fresh water was injected to the first syringe, and 3.5% salt water was injected to the second syringe. As a result, the amount of the liquid in the first syringe was decreased, and the liquid surface was moved at a speed of 0.07 ml/hour in a direction to the desalting membrane, i.e., the direction to the second syringe. On the other hand, the amount of the liquid in the second syringe was increased, and the liquid surface was moved at a speed of 0.028 ml/hour in a direction to the second syringe opening 91.

In Test No. 3, 3.5% salt water was injected to the first syringe, and fresh water was injected to the second syringe. As a result, the amount of the liquid in the first syringe was increased, and the liquid surface was moved at a speed of 0.14 ml/24 hour in a direction to the opening 58 of the first syringe. On the other hand, the amount of the liquid in the second syringe was decreased, and the liquid surface was moved at a speed of 0.028 ml/24 hour in a direction to the desalting membrane, i.e., the direction to the first syringe.

In Test No. 4, 1% salt water was injected to the first syringe, and fresh water was injected to the second syringe. As a result, the amount of the liquid in the first syringe was increased, and the liquid surface was moved at a speed of 0.08 ml/hour in a direction to the opening 58 of the first syringe. On the other hand, the amount of the liquid in the second syringe was decreased, and the liquid surface was moved at a speed of 0.028 ml/hour in a direction to the desalting membrane, i.e., the direction to the first syringe.

In Test No. 5, fresh water was injected to the first syringe, and 1% salt water was injected to the second syringe. As a result, the amount of the liquid in the first syringe was decreased, and the liquid surface was moved at a speed of 0.04 ml/hour in a direction to the desalting membrane, i.e., the direction to the second syringe. On the other hand, the amount of the liquid in the second syringe was increased, and the liquid surface was moved at a speed of 0.001 m/hour in a direction to the second syringe In Test No. 6, fresh water and the grafted base material using the beads with a graft rate of 3.5% were injected to the first syringe, and fresh water was injected to the second syringe. As a result, the amount of the liquid in the first syringe was increased, and the liquid surface was moved at a speed of 0.072 ml/24 hours in a direction to the opening 58 of the first syringe. On the other hand, the amount of the liquid in the second syringe was decreased, and the liquid surface was moved at a speed of 0.11 ml/24 hours in a direction to the desalting membrane, i.e., the direction to the first syringe.

In Test No. 7, fresh water was injected to the first syringe, and fresh water and the grafted base material using the beads with a graft rate of 3.5% were injected to the second syringe. As a result, the amount of the liquid in the first syringe was decreased, and the liquid surface was moved at a speed of 0.073 ml/24 hours in a direction to the desalting membrane, i.e., the direction to the second syringe. On the other hand, the amount of the liquid in the second syringe was increased, and the liquid surface was moved at a speed of 0.042 ml/24 hours in a direction to the second syringe opening 91.

In Test No. 8, fresh water and the grafted base material using beads with a graft rate of 1.4% were injected to the first syringe, and fresh water was injected to the second syringe. As a result, the amount of the liquid in the first syringe was increased, and the liquid surface was moved at a speed of 0.053 ml/24 hours in a direction to the opening 58 of the first syringe. On the other hand, the amount of the liquid in the second syringe was decreased, and the liquid surface was moved at a speed of 0.11 ml/24 hours in a direction to the desalting membrane, i.e., the direction to the first syringe.

In Test No. 9, fresh water was injected to the first syringe, and fresh water and the grafted base material using the beads with a graft rate of 1.4% were injected to the second syringe. As a result, the amount of the liquid in the first syringe was decreased, and the liquid surface was moved at a speed of 0.003 ml/24 hours in a direction to the desalting membrane, i.e., the direction to the second syringe. On the other hand, the amount of the liquid in the second syringe was increased, and the liquid surface was moved at a speed of 0.02 ml/24 hours in a direction to the second syringe opening 91.

The move of liquid in Test No. 1 was opposite to the move of liquid in Test No. 2. Form the result, it is understood that the water absorption speed is faster in the arrangement of the salt water on the active layer side.

The move speed in the case of the grafted base material using the beads is slower than that in the case of the material using the filter paper. This can be considered because, for example, when a membranous grafted base material such as the filter paper was used, evaporation between spaces makes the move speed of the liquid faster.

In Test No. 2 in Table 3, 70SWC which is an RO membrane for high pressure operation manufactured by Nitto Denko Corporation, was used. In this case, it was observed that the liquid was moved slower than the case where ES 20 was used, but the liquid was moved in the same direction.

from the results in Test Nos. 4 and 5, it is understood that water was also moved faster in the case where the salt water was arranged on the active layer side of the membrane when the 1% salt water was used.

As shown in Test Nos. 6 and 8, the water absorption speed was faster in the graft rate of 3.5% than in the graft of 1.4%. It could be confirmed that the direction of the membrane was important in Test Nos. 6 and 7.

Example 8

Confirmation of Importance of Membrane Direction

A nylon fabric (5×3 cm rectangle) was put in a glass tube, and substitution by argon gas was performed after degassing. Gamma-rays from cobalt 60 were applied to the nylon woven fabric at an absorbed dose of 10 kGy at room temperature while this state was kept. An aqueous acrylic acid solution (50% by volume), which had been degassed by bubbling with argon gas was added to the glass tube. Next, the glass tube was sealed, which was maintained at 30° C. for 4 hours. The obtained graft-polymerized nylon fabric was washed by immersing it in methanol and water for 12 hours each. After it was vacuum dried at 40° C., a graft rate of 55.2% was calculated from a weight of the graft-polymerized nylon fabric. The grafted base material was obtained as above.

Next, the nylon fabric graft-polymerized with 55.2% acrylic acid was treated with 1N NaOH over night, which was thoroughly washed with fresh water. Using obtained fabric, a syringe test was performed. The syringe test was performed by sleaving this nylon fabric, and arranging so as to bring 3 fibers thereof into contact with the active layer side of the RO membrane. As a result, it was observed that 0.03 ml of water was moved for 24 hours.

When the direction of the RO membrane was made opposite, i.e., when the 3 grafted nylon fibers were arranged on a side opposite to the active layer side of the RO membrane in the same manner as above, there were no changes in 24 hours. It was also confirmed that a non-processed nylon fabric had no effect. As can be seen, it was confirmed that the direction of the RO membrane was important.

For reference, a nylon fabric with a graft rate of 12.3% was subjected to the same treatment, and a syringe test was performed in a horizontal orientation. In this case, a small fabric piece (3 mm×3 mm) was used, and it was observed that 0.04 ml of water was moved in about 6 hours. From this result, it was confirmed the water absorption effect, that is, that an osmotic pressure was induced.

Example 9

A cotton fabric (plain weave) was graft-polymerized in the same manner as in Example 8 to graft polyacrylic acid in a graft rate of 9.7%. The obtained fabric was immersed in a 1N aqueous NaOH solution for 1 hour, and washed with a large amount of running water, and then a high pressure test was performed.

A weight of fresh water permeated was measured three times at 30° C., 1 MPa, and a solution sending of 2 ml/minute, min for 5 minutes. As a result, the weight was 1.72 in average when ES 20 membrane was used, but it was 1.84 g when this fabric was set, that is 7% increase was shown. In a non-processed fabric, decrease was observed when using 1.52 g of water, and thus it was considered that a pressure loss was large. In this case, when the pressure loss is taken into consideration, 22% increase can be shown form the non-processed fabric, and thus a large big effect by the present embodiment was shown. It is possible, therefore, to convert salt water to fresh water at a high flowing speed.

From the results in Examples described above, it is apparent that according to the present embodiment, it is possible to convert salt water to fresh water at a high flowing speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A desalination treatment membrane comprising:
    a desalting membrane having first and second surfaces; and
    a base material having a surface to which a solid salt is fixed by graft-polymerization and disposed such that the surface of the base material to which a solid salt is fixed by graft-polymerization is in contact with the first surface of the desalting membrane.

2. The desalination treatment membrane of claim 1, wherein the solid salt is an organic salt.

3. The desalination treatment membrane of claim 2, wherein the organic salt is selected from the group consisting of acrylic acid salt, methacrylic acid salt, sulfonic acid salt and quarternary ammonium salt.

4. The desalination treatment membrane of claim 1, wherein a graft rate of the solid salt to the base material by the graft-polymerization is from 2% to 50%.

5. The desalination treatment membrane of claim 1, wherein the base material to which the solid salt is fixed by the graft-polymerization is a base material to which a graft chain of sodium polyacrylate is bonded.

6. The desalination treatment membrane of claim 1, wherein the base material is selected from the group consisting of cellulose membrane, a fabric, and a resin membrane.

7. The desalination treatment membrane of claim 6, wherein the base material is paper.

8. The desalination treatment membrane of claim 1, wherein the base material is a filter paper or a non-woven fabric.

9. The desalination treatment membrane of claim 1, wherein the base material has a thickness of 1 μm to 100 μm.

10. A desalination treatment membrane comprising:
a desalting membrane; and
a base material disposed in contact with the desalting membrane, wherein a solid salt is fixed to the base material by a graft-polymerization, and the base material is selected from the group consisting of cellulose membrane, a fabric, and a resin membrane.

11. The desalination treatment membrane of claim 10, wherein the solid salt is an organic salt.

12. The desalination treatment membrane of claim 11, wherein the organic salt is selected from the group consisting of acrylic acid salt, methacrylic acid salt, sulfonic acid salt and quarternary ammonium salt.

13. The desalination treatment membrane of claim 10, wherein a graft rate of the solid salt to the base material by the graft-polymerization is from 2% to 50%.

14. The desalination treatment membrane of claim 10, wherein the base material to which the solid salt is fixed by the graft-polymerization is a base material to which a graft chain of sodium polyacrylate is bonded.

15. The desalination treatment membrane of claim 10, wherein the base material is paper.

16. The desalination treatment membrane of claim 10, wherein the base material is a filter paper or a non-woven fabric.

17. The desalination treatment membrane of claim 10, wherein the base material has a thickness of 1 μm to 100 μm.

* * * * *